(12) United States Patent
Onigata (10) Patent No.: US 7,637,240 B2
(45) Date of Patent: Dec. 29, 2009

(54) ENGINE BALANCER (75) Inventor: Ryoji Onigata, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 198 days.

(21) Appl. No.: 11/822,073

(22) Filed: Jul. 2, 2007

(65) Prior Publication Data

US 2008/0009376 A1 Jan. 10, 2008

(30) Foreign Application Priority Data

Jul. 4, 2006 (JP) .............................. 2006-183999

(51) Int. Cl.
*F02B 75/06* (2006.01)
(52) U.S. Cl. .................................. 123/192.2; 74/603
(58) Field of Classification Search ............... 123/192.2
See application file for complete search history.

(56) References Cited

U.S. PATENT DOCUMENTS

2005/0061284 A1* 3/2005 Sato et al. ................ 123/192.2

FOREIGN PATENT DOCUMENTS

JP 2000-65150 A 3/2000

\* cited by examiner

*Primary Examiner*—Noah Kamen
(74) *Attorney, Agent, or Firm*—Foley & Lardner LLP (57) ABSTRACT

An engine balancer including a rotatable drive balance shaft having a first balance weight and a first portion formed at a position offset from the first balance weight in an axial direction of the drive balance shaft, a drive gear disposed on the drive balance shaft, a driven gear meshed with the drive gear, a driven balance shaft parallel to the drive balance shaft and rotatable with the driven gear, the driven balance shaft including a second balance weight and a second portion formed at a position offset from the second balance weight in an axial direction of the driven balance shaft. The second portion of the driven balance shaft is constructed to produce a moment of inertia less than a moment of inertia that is produced in the first portion of the drive balance shaft.

23 Claims, 5 Drawing Sheets

ENGINE BALANCER

BACKGROUND OF THE INVENTION

The present invention relates to an engine balancer for a vehicle, such as an automobile, which can effectively reduce vibration that is caused in the engine. More specifically, the present invention relates to an engine balancer which can effectively reduce gear rattle noise that is caused by mutually meshing teeth of a drive gear and a driven gear of the engine balancer during operation of the engine.

Japanese Patent Application First Publication No. 2000-65150 discloses an engine balancer for an automobile which is disposed within an oil pan below a cylinder block of the engine. The engine balancer includes a casing fixed to a lower portion of the cylinder block and a pair of balance shafts disposed parallel to each other within the casing. The balance shafts, namely, a drive balance shaft and a driven balance shaft, are rotatably supported at journals which are disposed on front-end and rear-end portions of the respective balance shafts. The drive balance shaft has an axial length longer than that of the driven balance shaft. The drive balance shaft has balance weights on the rear side portion and a drive gear on the front end portion. The balance weights and the drive gear are integrally formed with the drive balance shaft. A sprocket is disposed on the front end portion of the drive balance shaft. The sprocket is connected with a sprocket disposed on a distal end portion of the crankshaft through a chain which is wound around the sprockets. The drive balance shaft is rotationally driven by a crankshaft via the chain. The driven balance shaft has balance weights on the rear side portion and a driven gear on the front side portion. The driven gear is meshed with the drive gear and transmits the rotation of the drive balance shaft to the driven balance shaft. An oil pump is arranged on the rear end portion of the driven balance shaft. When the crankshaft is rotationally driven at the start of the engine operation, the drive balance shaft with the drive gear is rotated at a speed twice crankshaft speed in one direction. The rotation of the drive gear is transmitted to the driven gear so that the driven balance shaft is rotated in a direction opposite to the one direction through the meshing engagement of the driven gear with the drive gear. The respective balance weights on the drive and the driven balance shafts are rotated and effectively suppress a second order vibration.

SUMMARY OF THE INVENTION

In the conventional engine balancer as described above, the rotational force of the crankshaft is directly transmitted to the drive balance shaft. Owing to the demand for reducing torsional vibration, a portion of the drive balance shaft which is located in a position axially offset from the balance weights is required to have a relatively large diameter in order to ensure high rigidity. On the other hand, a portion of the driven balance shaft which is located in a position axially offset from the balance weights has the same diameter as the portion of the drive balance shaft, regardless of no need to ensure high rigidity. This results in a relatively large weight of the driven balance shaft, causing increase in moment of inertia during rotation of the driven balance shaft. Therefore, an impact energy that is produced when teeth of the drive gear impinge against teeth of the driven gear due to a backlash between the mutually meshing teeth of the drive gear and the driven gear, is increased to thereby cause large gear rattle noise. Particularly, when the rotation of the crankshaft is fluctuated, there occurs fluctuation of rotation of each of the drive balance shaft and driven balance shaft. This causes a significantly large gear rattle noise in the engine balancer, which constitutes a factor of engine drive noise.

It is an object of the present invention to solve the above-described problems in the technologies of the conventional art and to provide an engine balancer which can suppress occurrence of large gear rattle noise between meshing teeth of the drive gear and the driven gear by reducing a weight of the driven balance shaft which is not required to ensure a high rigidity as compared to the drive balance shaft.

The other objects and features of this invention will become understood from the following description with reference to the accompanying drawings.

In one aspect of the present invention, there is provided a balancer for an engine with a crankshaft, comprising:

a rotatable drive balance shaft comprising a first balance weight and a first portion formed at a position offset from the first balance weight in an axial direction of the drive balance shaft, the drive balance shaft being adapted to be operatively connected with the crankshaft of the engine for rotation with the crankshaft;

a drive gear fixedly disposed on the drive balance shaft;

a rotatable driven balance shaft disposed parallel to the drive balance shaft, the driven balance shaft comprising a second balance weight and a second portion formed at a position offset from the second balance weight in an axial direction of the driven balance shaft, and a driven gear fixedly disposed on the driven balance shaft, the driven gear being meshed with the drive gear and transmitting a rotational force from the drive balance shaft to the driven balance shaft, wherein the second portion of the driven balance shaft is smaller in outer diameter than the first portion of the drive balance shaft.

In a further aspect of the invention, there is provided a balancer for an engine with a crankshaft, comprising:

a rotatable drive balance shaft comprising a first balance weight and a first portion formed at a position offset from the first balance weight in an axial direction of the drive balance shaft, the drive balance shaft being adapted to be operatively connected with the crankshaft of the engine for rotation with the crankshaft;

a drive gear fixedly disposed on the drive balance shaft;

a rotatable driven balance shaft disposed parallel to the drive balance shaft, the driven balance shaft comprising a second balance weight and a second portion formed at a position offset from the second balance weight in an axial direction of the driven balance shaft, and a driven gear disposed on the driven balance shaft and integrally formed with the driven balance shaft, the driven gear being meshed with the drive gear and transmitting a rotational force from the drive balance shaft to the driven balance shaft, wherein the second portion of the driven balance shaft is less in weight than the first portion of the drive balance shaft.

In a still further aspect of the invention, there is provided a balancer for an engine with a crankshaft, comprising:

a rotatable drive balance shaft comprising a first balance weight and a first portion formed at a position offset from the first balance weight in an axial direction of the drive balance shaft, the drive balance shaft being adapted to be operatively connected with the crankshaft of the engine for rotation with the crankshaft in a first direction;

a drive gear fixedly disposed on the drive balance shaft;

a driven gear meshed with the drive gear and receiving a rotational force in a direction opposite to the first direction of rotation of the drive balance shaft; and a rotatable driven balance shaft disposed parallel to the drive balance shaft, the driven balance shaft being rotatable with the driven gear, the driven balance shaft comprising a second balance weight and a second portion formed at a position offset from the second balance weight in an axial direction of the driven balance shaft, wherein the second portion of the driven balance shaft is constructed to produce a moment of inertia less than a moment of inertia that is produced in the first portion of the drive balance shaft.

DETAILED DESCRIPTION OF THE INVENTION

Referring now to FIGS. 1-4, an embodiment of a balancer for an engine, according to the present invention, is explained. For ease of understanding, various directional terms, such as right, left, upper, lower, rightward and the like are used in the description. However, such terms are to be understood with respect to only a drawing or drawings on which a corresponding part or portion is shown. In this embodiment, the engine balancer is applied to an in-line four-cylinder engine for automobiles.

Figure 3:
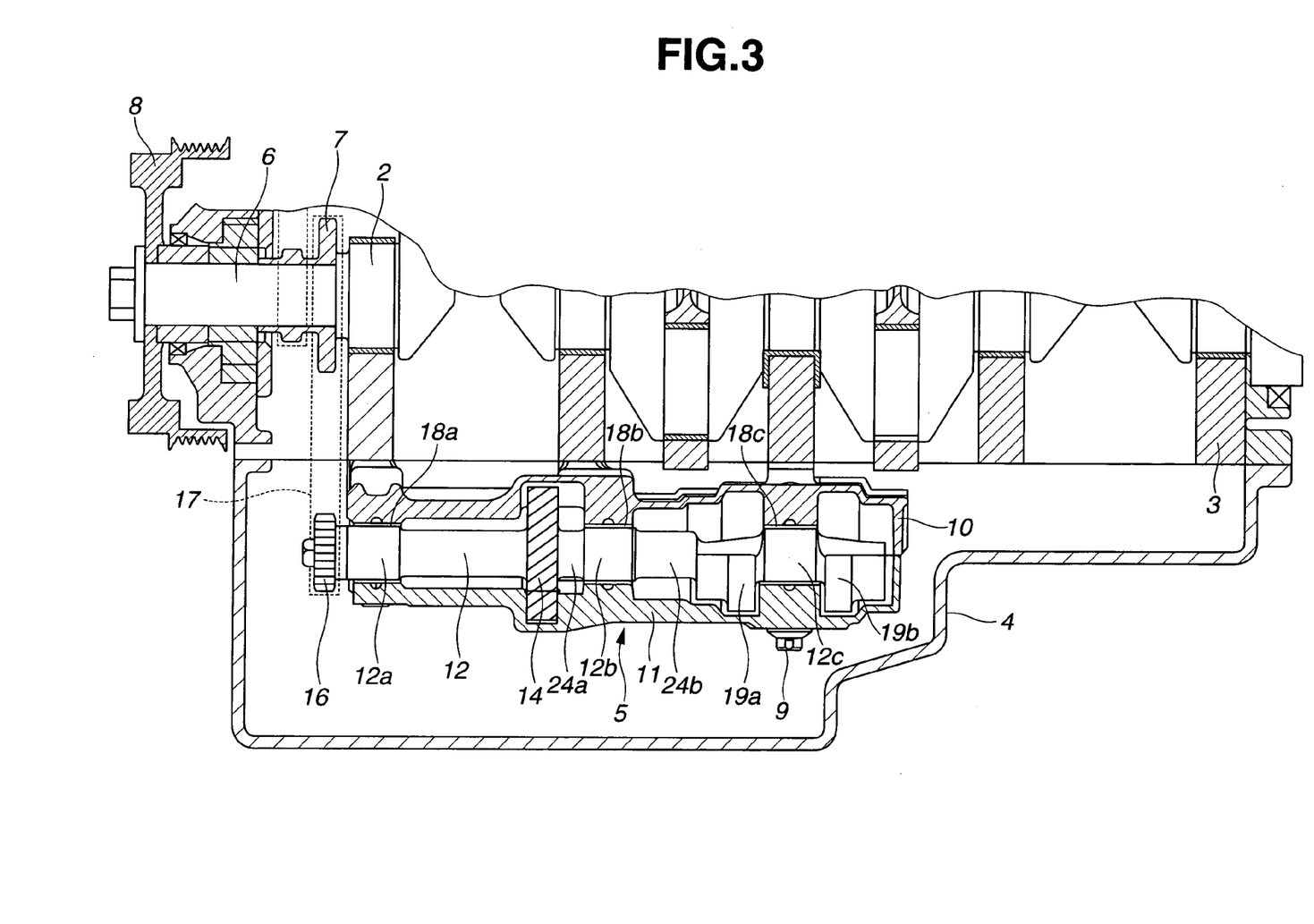
FIG. 3 is a fragmentary vertical cross-section of the essential part of the engine balancer shown in FIG. 1.
Figure 4:
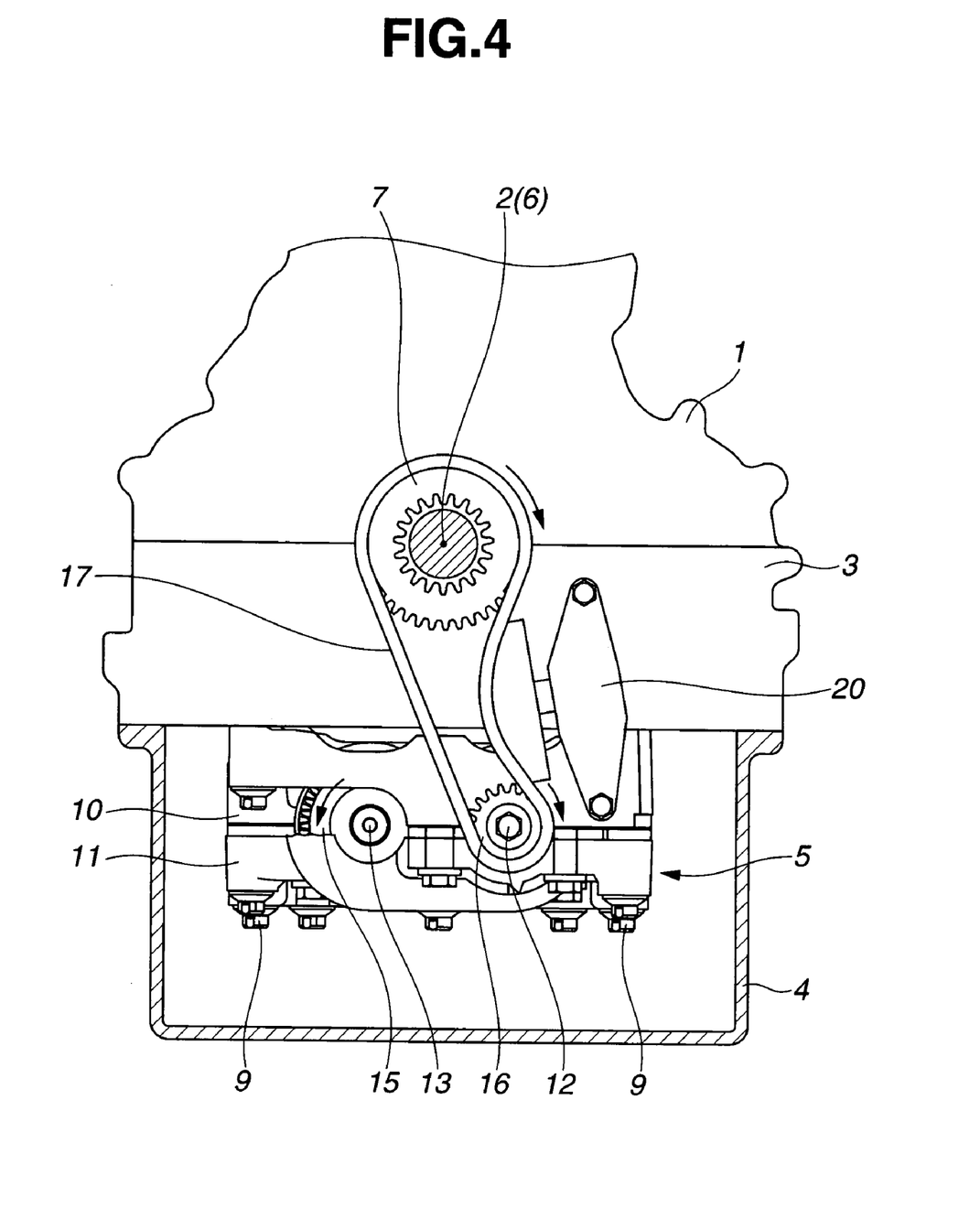
FIG. 4 is a front view of an engine to which the embodiment of the engine balancer of the present invention is applied.

As illustrated in FIG. 4, ladder type frame 3 is fixed to an underside of cylinder block 1 of the engine. As illustrated in FIGS. 3-4, crankshaft 2 is rotatably supported on ladder type frame 3 through a bearing. Ladder type frame 3 is made of an aluminum alloy. Oil pan 4 is mounted to a lower portion of ladder type frame 3. Engine balancer 5 is disposed within oil pan 4.

As illustrated in FIG. 3, crankshaft 2 includes sprocket mounting shaft 6 at a front end portion thereof in a fore-and-aft direction of the engine. Sprocket mounting shaft 6 is integrally formed with the front end portion of crankshaft 2. Crank sprocket 7 having a relatively large diameter is supported on sprocket mounting shaft 6. Drive pulley 8 is mounted onto a tip end portion of sprocket mounting shaft 6.

As seen from FIGS. 3 and 4, engine balancer 5 includes upper housing 10, lower housing 11, drive balance shaft 12 and driven balance shaft 13. Upper housing 10 and lower housing 11 are fixed together to the underside of ladder type frame 3 by means of a plurality of bolts 9. Drive balance shaft 12 and driven balance shaft 13 are supported between upper housing 10 and lower housing 11 so as to be rotatable about axes of drive balance shaft 12 and driven balance shaft 13, respectively. Drive balance shaft 12 and driven balance shaft 13 are disposed parallel to each other in the fore-and-aft direction of the engine. Drive balance shaft 12 and driven balance shaft 13 are constructed to rotate at a speed twice crankshaft speed. Balance sprocket 16 is fixed to a front end portion of drive balance shaft 12. As shown in FIG. 4, endless transmission member 17 is wound around crank sprocket 7 and balance sprocket 16 and connects the two sprockets 7 and 16. Endless transmission member 17 is operative to transmit a rotational force of crankshaft 2 to drive balance shaft 12. Endless transmission member 17 may be in the form of an endless chain. Tension applying mechanism 20 is provided, which is constructed to apply a tension to endless transmission member 17.

Figure 1:
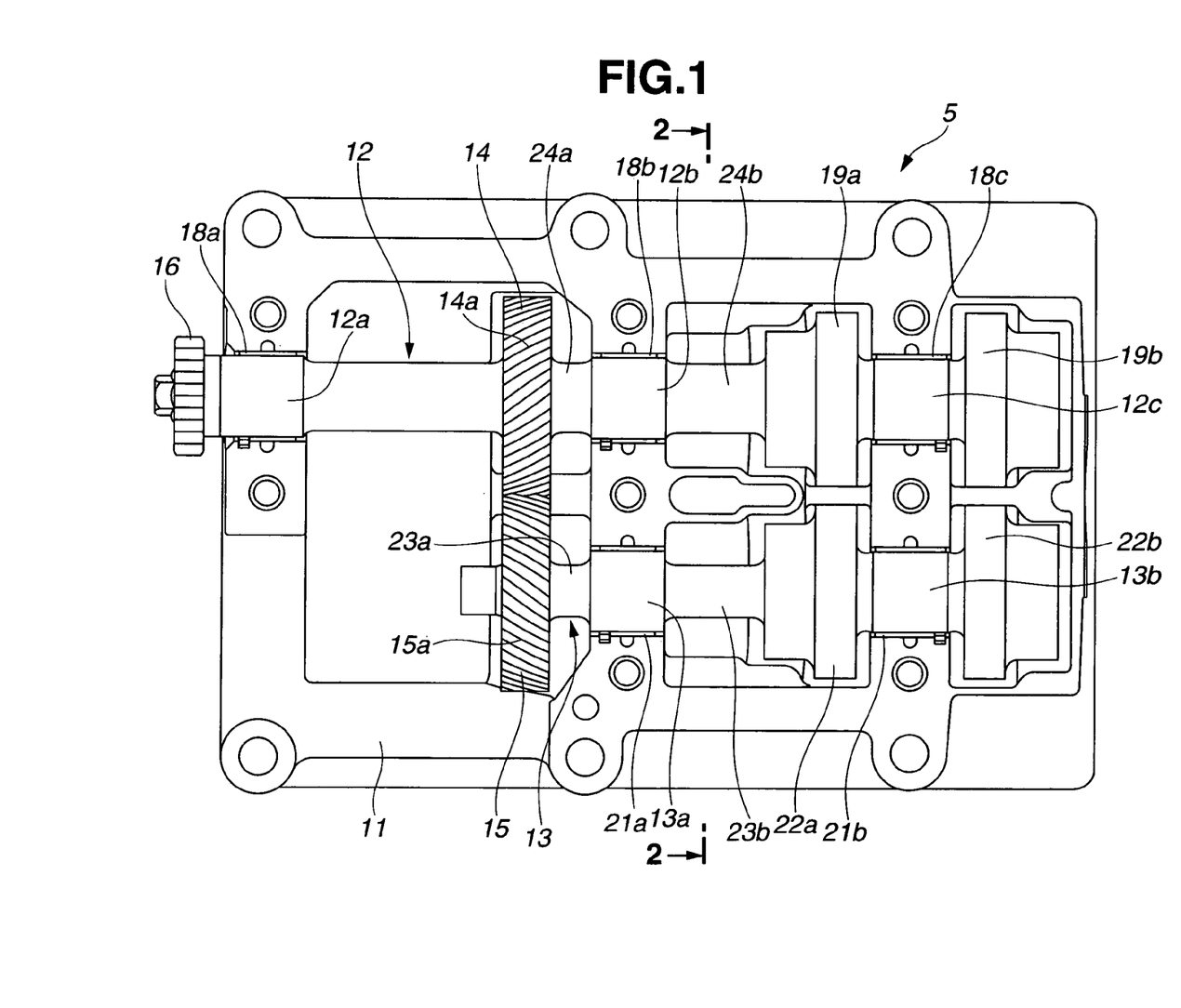
FIG. 1 is a plan view of an essential part of an embodiment of an engine balancer according to the present invention.

As illustrated in FIG. 1, engine balancer 5 further includes drive gear 14 which is fixedly disposed on a front side of drive balance shaft 12, and driven gear 15 which is fixedly disposed on a front end portion of driven balance shaft 13 and meshed with drive gear 14. Drive gear 14 and driven gear 15 are in the form of a helical gear. Teeth 14a of drive gear 14 and teeth 15a of driven gear 15 are in meshing engagement with each other. Driven gear 15 receives a rotational force in a direction opposite to the direction of rotation of drive balance shaft 12 through the meshing engagement of teeth 14a and teeth 15a.

As illustrated in FIG. 1, drive balance shaft 12 has a relatively large axial length that extends in a direction of the axis of drive balance shaft 12. The axial length of drive balance shaft 12 is larger than an axial length of driven balance shaft 13 that extends in a direction of the axis of driven balance shaft 13. Drive balance shaft 12 includes three large-diameter journals 12a, 12b and 12c which are spaced from each other in the axial direction of drive balance shaft 12. Journal 12a is located on a front end portion of drive balance shaft 12 in the fore-and-aft direction of the engine. Journal 12c is located on a rear side of drive balance shaft 12 in the fore-and-aft direction of the engine. Journal 12b is located on an intermediate portion of drive balance shaft 12 between the front and rear end portions of drive balance shaft 12. Journals 12a and 12b are located to be offset from drive gear 14 in opposite axial directions of drive balance shaft 12. As seen from FIGS. 1 and 3, drive balance shaft 12 is rotatably supported at front journal 12a, intermediate journal 12b and rear journal 12c through plain bearings 18a, 18b and 18c which are disposed between upper housing 10 and lower housing 11.

As illustrated in FIGS. 1 and 3, drive balance shaft 12 further includes two balance weights 19a and 19b which are integrally formed with drive balance shaft 12. Balance weights 19a and 19b are spaced from each other in the axial direction of drive balance shaft 12. Balance weight 19a is disposed between intermediate journal 12b and rear journal 12c. Balance weight 19b is disposed on a rear end portion of drive balance shaft 12.

Drive balance shaft 12 further includes connecting portions 24a and 24b each being formed at a position offset from both of balance weights 19a and 19b in the axial direction of drive balance shaft 12. Specifically, connecting portion 24a is disposed between drive gear 14 and intermediate journal 12b, and connecting portion 24b is disposed between intermediate journal 12b and balance weight 19a. Connecting portions 24a and 24b have a relatively large diameter as well as journals 12a, 12b and 12c in order to ensure high torsional rigidity. This is because drive balance shaft 12 has the relatively long axial length and a load is exerted on drive balance shaft 12 in a radial direction of drive balance shaft 12 due to the tension that is caused when the rotational force of crankshaft 2 is transmitted to drive balance shaft 12 via sprockets 7, 16 and endless transmission member 17.

As illustrated in FIG. 1, driven balance shaft 13 has the axial length of about ⅔ of the axial length of drive balance shaft 12. Driven balance shaft 13 includes two large-diameter journals 13a and 13b which are offset from driven gear 15 and spaced from each other in the axial direction of driven balance shaft 13. Journals 13a and 13b are opposed to journals 12b and 12c of drive balance shaft 12 in a direction perpendicular to the axial direction of driven balance shaft 13, respectively. The outer diameter of journals 13a and 13b of driven balance shaft 13 are relatively large and substantially equal to the outer diameter of journals 12a, 12b and 12c. Journal 13a is located on a front side of driven balance shaft 13 in the fore-and-aft direction of the engine. Journal 13b is located on a rear side of driven balance shaft 13 in the fore-and-aft direction of the engine. Driven balance shaft 13 is rotatably supported at front journal 13a and rear journal 13b through plain bearings 21a and 21b which are disposed between upper housing 10 and lower housing 11.

Lubricating oil is introduced into plain bearings 18a, 18b, 18c and plain bearings 21a, 21b via oil passages which are formed in upper and lower housings 10 and 11 and grooves which are formed in inner circumferential surfaces of respective plain bearings 18a, 18b, 18c, 21a and 21b.

As illustrated in FIG. 1, driven balance shaft 13 further includes two balance weights 22a and 22b which are integrally formed with driven balance shaft 13 and spaced from each other in the axial direction of driven balance shaft 13. Balance weights 22a and 22b are arranged to be opposed to balance weights 19a and 19b of drive balance shaft 12 in the direction perpendicular to the axial direction of driven balance shaft 13, respectively. Balance weight 22a is disposed between front journal 13a and rear journal 13b. Balance weight 22b is disposed on a rear end portion of driven balance shaft 13.

Figure 2:
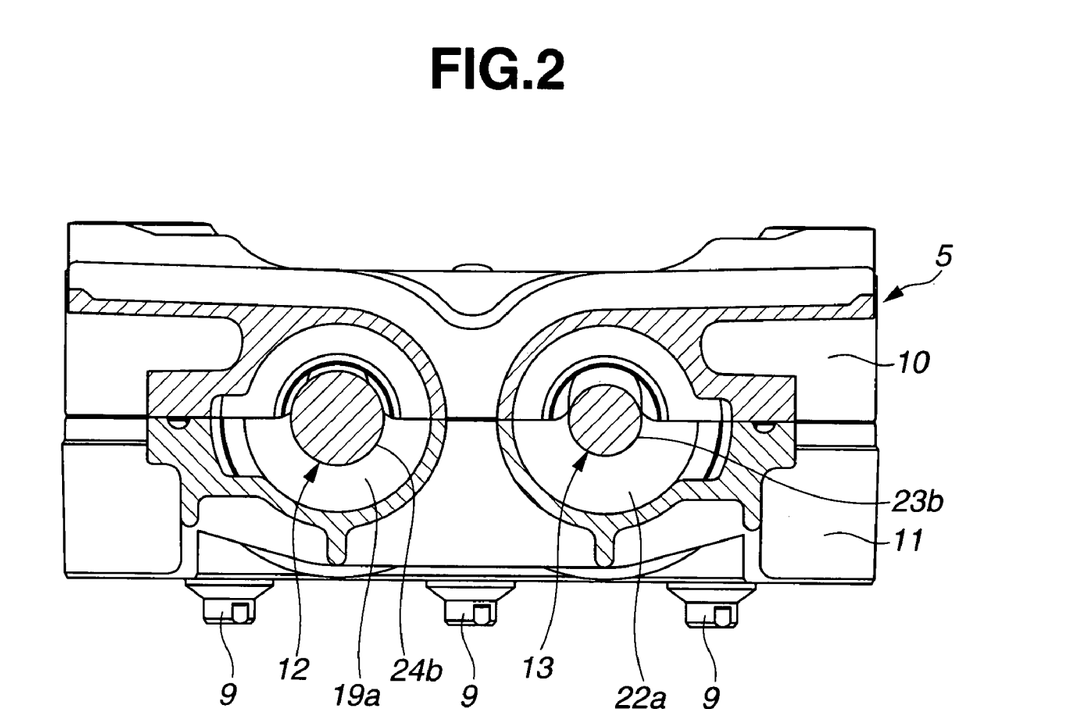
FIG. 2 is a cross-section taken along line 2-2 of FIG. 1.

As illustrated in FIG. 1, driven balance shaft 13 further includes connecting portions 23a and 23b each being formed at a position offset from both of balance weights 22a and 22b in the axial direction of driven balance shaft 13. Specifically, connecting portion 23a is disposed between driven gear 15 and front journal 13a, and connecting portion 23b is disposed between front journal 13a and balance weight 22a. Connecting portions 23a and 23b are opposed to connecting portions 24a and 24b of drive balance shaft 12 in the direction perpendicular to the axial direction of driven balance shaft 13, respectively. Connecting portions 23a and 23b have an outer diameter smaller than an outer diameter of corresponding connecting portions 24a and 24b of drive balance shaft 12. FIG. 2 shows only connecting portion 23b smaller in outer diameter than corresponding connecting portion 24b of drive balance shaft 12.

The reason that connecting portions 23a and 23b of driven balance shaft 13 are constructed to be smaller in outer diameter than connecting portions 24a and 24b of drive balance shaft 12 is as follows. The axial length of driven balance shaft 13 is shorter than that of drive balance shaft 12 and undergoes a load caused due to the rotational force of crankshaft 2 which is less than the load that is exerted on drive balance shaft 12. The rotational force of crankshaft 2 is indirectly transmitted to driven balance shaft 13 through the meshing engagement between drive gear 14 on drive balance shaft 12 and driven gear 15 on driven balance shaft 13. Accordingly, driven balance shaft 13 is not required to have high torsional rigidity at connecting portions 23a and 23b, in contrast with drive balance shaft 12.

Owing to the reduction in outer diameter of connecting portions 23a and 23b of driven balance shaft 13 as compared to connecting portions 24a and 24b of drive balance shaft 12, the weight of connecting portions 23a and 23b becomes less than the weight of connecting portions 24a and 24b. Therefore, a total weight of driven balance shaft 13 can be reduced, so that a moment of inertia of driven balance shaft 13 which is produced during the rotation of driven balance shaft 13 can be decreased. As a result, it is possible to considerably reduce an impact energy that is produced due to the backlash between teeth 14a of drive gear 14 and teeth 15a of driven gear 15 which is caused by fluctuation of the rotation of crankshaft 2 upon mutually engaging teeth 14a with teeth 15a. This serves for suppressing occurrence of large gear rattle noise between mutually meshing teeth 14a of drive gear 14 and teeth 15a of driven gear 15 and therefore serves for reducing engine noise.

Further, the reduction in outer diameter of connecting portions 23a and 23b of driven balance shaft 13 can serve for reducing a total weight of engine balancer 5 and enhancing fuel economy of the engine.

Further, as explained above, the outer diameter of journals 13a and 13b of driven balance shaft 13 are relatively large and substantially equal to the outer diameter of journals 12a, 12b and 12c of drive balance shaft 12. With this construction of journals 13a and 13b, driven balance shaft 13 can endure the load that is exerted on driven balance shaft 13 through journals 13a and 13b due to balance weights 22a and 22b. In addition, the durability of journals 13a and 13b can be maintained without being deteriorated.

Further, with the construction of journals 13a and 13b of driven balance shaft 13, journals 13a and 13b and the corresponding bearing portions of upper and lower housings 10 and 11 can be formed with substantially the same dimension as that of journals 12a, 12b and 12c of drive balance shaft 12. This serves for simplifying the work for producing engine balancer 5 and therefore facilitating the production of engine balancer 5.

Further, drive gear 14 and driven gear 15 are constituted of a helical gear which produces a small gear rattle noise between teeth 14a of drive gear 14 and teeth 15a of driven gear 15. Therefore, it is possible to reduce the gear rattle noise between teeth 14a of drive gear 14 and teeth 15a of driven gear 15.

Figure 5:
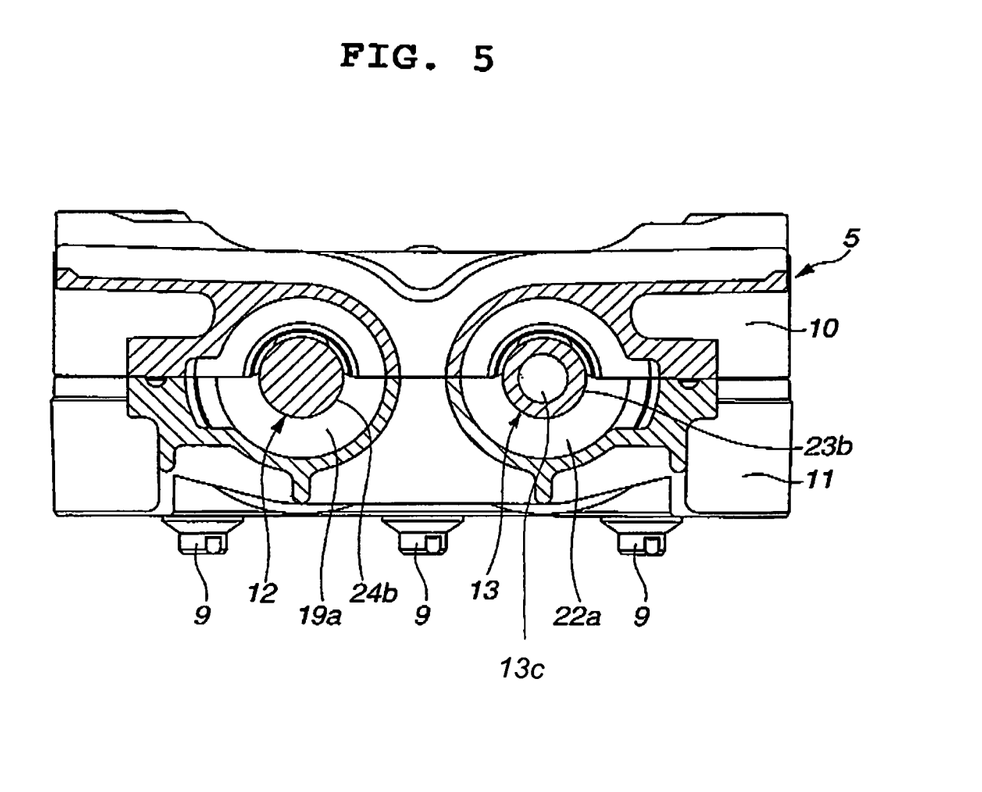
FIG. 5 is a cross-section taken along line 2-2 of FIG. 1, with the driven balance shaft having a hollow structure with an inside space.

The construction of the engine balancer of the present invention is not limited to the above-described embodiment. Driven balance shaft 13 can be reduced in weight, for instance, by changing a material of driven balance shaft 13 or forming driven balance shaft 13 into a hollow structure 13c with an inside space.

Further, a ratio of the amount of reduction in outer diameter of journals 13a and 13b of driven balance shaft 13 to the entire outer diameter thereof can be optionally set depending on a size or specification of the engine and the engine balancer.

Further, the axial length of the drive balance shaft and the axial length of the driven balance shaft can be equal to each other. Furthermore, the engine balancer of the present invention can be applied to engines for various kinds of vehicles including automobiles, ships and vessels.

This application is based on a prior Japanese Patent Application No. 2006-183999 filed on Jul. 4, 2006. The entire contents of the Japanese Patent Application No. 2006-183999 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A balancer for an engine with a crankshaft, comprising:
a rotatable drive balance shaft comprising a first balance weight and a first portion formed at a position offset from the first balance weight in an axial direction of the drive balance shaft, the drive balance shaft being adapted to be operatively connected with the crankshaft of the engine for rotation with the crankshaft;
a drive gear fixedly disposed on the drive balance shaft;

a rotatable driven balance shaft disposed parallel to the drive balance shaft, the driven balance shaft comprising a second balance weight and a second portion formed at a position offset from the second balance weight in an axial direction of the driven balance shaft, and a driven gear fixedly disposed on the driven balance shaft, the driven gear being meshed with the drive gear and transmitting a rotational force from the drive balance shaft to the driven balance shaft, wherein the second portion of the driven balance shaft is smaller in outer diameter than the first portion of the drive balance shaft.

2. The balancer as claimed in claim 1, wherein the second portion of the driven balance shaft is opposed to the first portion of the drive balance shaft in a direction perpendicular to the axial direction of the driven balance shaft.

3. The balancer as claimed in claim 1, wherein the drive balance shaft further comprises a journal at which the drive balance shaft is rotatably supported, the journal of the drive balance shaft being disposed to be offset from the first portion, the first balance weight and the drive gear in the axial direction of the drive balance shaft, and the driven balance shaft further comprises a journal at which the driven balance shaft is rotatably supported, the journal of the driven balance shaft being disposed to be offset from the second portion, the second balance weight and the driven gear in the axial direction of the driven balance shaft.

4. The balancer as claimed in claim 3, wherein the first portion of the drive balance shaft is disposed at connecting portions between the journal of the drive balance shaft and the first balance weight and between the journal of the drive balance shaft and the drive gear, and the second portion of the driven balance shaft is disposed at connecting portions between the journal of the driven balance shaft and the second balance weight and between the journal of the driven balance shaft and the driven gear.

5. The balancer as claimed in claim 1, wherein the drive balance shaft has an axial length larger than an axial length of the driven balance shaft.

6. The balancer as claimed in claim 5, further comprising a sprocket which is fixed to an axial end of the drive balance shaft.

7. The balancer as claimed in claim 6, further comprising an endless transmission member which is wound around the sprocket, the endless transmission member connecting the sprocket and the crankshaft and being operative to transmit a rotational force of the crankshaft to the drive balance shaft.

8. The balancer as claimed in claim 7, further comprising a tension applying mechanism which is constructed to apply a tension to the endless transmission member.

9. The balancer as claimed in claim 5, wherein the drive balance shaft further comprises three journals at which the drive balance shaft is rotatably supported, the three journals being disposed to be offset from each other in the axial direction of the drive balance shaft, and the driven balance shaft further comprises two journals at which the driven balance shaft is rotatably supported, the two journals being disposed to be offset from each other in the axial direction of the driven balance shaft.

10. The balancer as claimed in claim 9, wherein the first balance weight and the second balance weight comprise two balance weights, respectively.

11. The balancer as claimed in claim 10, wherein the first portion of the drive balance shaft is disposed at connecting portions between one of the three journals and the drive gear and between the one of the three journals and one of the two balance weights of the first balance weight, and the second portion of the driven balance shaft is disposed at connecting portions between one of the two journals and the driven gear and between the one of the two journals and one of the two balance weights of the second balance weight.

12. The balancer as claimed in claim 1, wherein the drive gear and the driven gear are helical gears, respectively.

13. A balancer for an engine with a crankshaft, comprising:

a rotatable drive balance shaft comprising a first balance weight and a first portion formed at a position offset from the first balance weight in an axial direction of the drive balance shaft, the drive balance shaft being adapted to be operatively connected with the crankshaft of the engine for rotation with the crankshaft;

a drive gear fixedly disposed on the drive balance shaft;

a rotatable driven balance shaft disposed parallel to the drive balance shaft, the driven balance shaft comprising a second balance weight and a second portion formed at a position offset from the second balance weight in an axial direction of the driven balance shaft; and a driven gear disposed on the driven balance shaft and integrally formed with the driven balance shaft, the driven gear being meshed with the drive gear and transmitting a rotational force from the drive balance shaft to the driven balance shaft;

wherein the second portion of the driven balance shaft is less in weight than the first portion of the drive balance shaft;

wherein the drive balance shaft further comprises a journal at which the drive balance shaft is rotatably supported, the journal of the drive balance shaft being disposed to be offset from the first portion, the first balance weight and the drive gear in the axial direction of the drive balance shaft, and the driven balance shaft further comprises a journal at which the driven balance shaft is rotatably supported, the journal of the driven balance shaft being disposed to be offset from the second portion, the second balance weight and the driven gear in the axial direction of the driven balance shaft, wherein the first portion of the drive balance shaft is disposed at connecting portions between the journal of the drive balance shaft and the first balance weight and between the journal of the drive balance shaft and the drive gear, and the second portion of the driven balance shaft is disposed at connecting portions between the journal of the driven balance shaft and the second balance weight and between the journal of the driven balance shaft and the driven gear.

14. The balancer as claimed in claim 13, wherein the second portion of the driven balance shaft is made of a material that is less in weight than a material of the first portion of the drive balance shaft.

15. The balancer as claimed in claim 13, wherein the second portion of the driven balance shaft is formed into a hollow structure with an inside space.

16. The balancer as claimed in claim 13, wherein the second portion of the driven balance shaft is opposed to the first portion of the drive balance shaft in a direction perpendicular to the axial direction of the driven balance shaft.

17. The balancer as claimed in claim 13, wherein the drive balance shaft has an axial length larger than an axial length of the driven balance shaft.

18. The balancer as claimed in claim 13, further comprising a sprocket which is fixed to an axial end of the drive balance shaft, and an endless transmission member which is wound around the sprocket, the endless transmission member connecting the sprocket and the crankshaft and being operative to transmit a rotational force of the crankshaft to the drive balance shaft.

19. The balancer as claimed in claim 13, wherein the drive gear and the driven gear are helical gears, respectively.

20. A balancer for an engine with a crankshaft, comprising:
a rotatable drive balance shaft comprising a first balance weight and a first portion formed at a position offset from the first balance weight in an axial direction of the drive balance shaft, the drive balance shaft being adapted to be operatively connected with the crankshaft of the engine for rotation with the crankshaft in a first direction;
a drive gear fixedly disposed on the drive balance shaft;
a driven gear meshed with the drive gear and receiving a rotational force in a direction opposite to the first direction of rotation of the drive balance shaft; and
a rotatable driven balance shaft disposed parallel to the drive balance shaft, the driven balance shaft being rotatable with the driven gear, the driven balance shaft comprising a second balance weight and a second portion formed at a position offset from the second balance weight in an axial direction of the driven balance shaft,
wherein the second portion of the driven balance shaft is constructed to produce a moment of inertia less than a moment of inertia that is produced in the first portion of the drive balance shaft,
wherein the drive balance shaft further comprises a journal at which the drive balance shaft is rotatably supported, the journal of the drive balance shaft being disposed to be offset from the first portion, the first balance weight and the drive gear in the axial direction of the drive balance shaft, and the driven balance shaft further comprises a journal at which the driven balance shaft is rotatably supported, the journal of the driven balance shaft being disposed to be offset from the second portion, the second balance weight and the driven gear in the axial direction of the driven balance shaft, and
wherein the first portion of the drive balance shaft is disposed at connecting portions between the journal of the drive balance shaft and the first balance weight and between the journal of the drive balance shaft and the drive gear, and the second portion of the driven balance shaft is disposed at connecting portions between the journal of the driven balance shaft and the second balance weight and between the journal of the driven balance shaft and the driven gear.

21. The balancer as claimed in claim 20, wherein the drive balance shaft has an axial length larger than an axial length of the driven balance shaft.

22. The balancer as claimed in claim 20, further comprising a sprocket which is fixed to an axial end of the drive balance shaft, and an endless transmission member which is wound around the sprocket, the endless transmission member connecting the sprocket and the crankshaft and being operative to transmit a rotational force of the crankshaft to the drive balance shaft.

23. The balancer as claimed in claim 20, wherein the drive gear and the driven gear are helical gears, respectively.

* * * * *